(12) United States Patent  (10) Patent No.: US 8,026,014 B2
Shim et al.  (45) Date of Patent: Sep. 27, 2011

(54) SOLID OXIDE FUEL CELL COMPONENTS TUNED BY ATOMIC LAYER DEPOSITION

(75) Inventors: Joon Hyung Shim, Cupertino, CA (US); Hong Huang, Palo Alto, CA (US); Masayuki Sugawara, Palo Alto, CA (US); Friedrich B. Prinz, Woodside, CA (US)

(73) Assignees: The Board of Trustees of the Leland Stanford Junior University, Palo Alto, CA (US); Honda Motor Co., Ltd, Tokyo (JP)

( * ) Notice: Subject to any disclaimer, the term of this patent is extended or adjusted under 35 U.S.C. 154(b) by 775 days.

(21) Appl. No.: 12/150,942

(22) Filed: Apr. 30, 2008

(65) Prior Publication Data

US 2008/0311455 A1  Dec. 18, 2008

Related U.S. Application Data

(60) Provisional application No. 60/930,592, filed on May 16, 2007.

(51) Int. Cl.
*H01M 4/94* (2006.01)
*H01M 8/12* (2006.01)

(52) U.S. Cl. .................. 429/480; 429/485; 429/495

(58) Field of Classification Search .................. 429/480, 429/485, 487, 495, 496, 534
See application file for complete search history.

(56) References Cited

U.S. PATENT DOCUMENTS

| | | | |
|---|---|---|---|
| 6,849,354 B2 * | 2/2005 | Hara et al. | 429/496 |
| 6,893,760 B2 * | 5/2005 | Shibata et al. | 429/487 |
| 7,141,327 B2 * | 11/2006 | Taniguchi | 429/495 |
| 7,625,653 B2 * | 12/2009 | Kuroha et al. | 429/495 |
| 2003/0194592 A1 | 10/2003 | Hilliard | |
| 2007/0082254 A1 | 4/2007 | Hiwatashi | |
| 2007/0243443 A1 * | 10/2007 | Iijima et al. | 429/30 |

* cited by examiner

*Primary Examiner* — Stephen J. Kalafut
(74) *Attorney, Agent, or Firm* — Lumen Patent Firm

(57) ABSTRACT

A reduced cost solid oxide fuel cell having enhanced surface exchange rates and diffusivity of oxide ions is provided. The invention cell includes a first porous electrode and a second porous electrode, where the porous electrodes have a layer of electronically conductive porous non-precious metal, and the porous non-precious metal layer is a gas diffusion layer. The porous electrodes further include at least one atomic layer of catalytic metal deposited on the non-precious metal layer, and an electrolyte layer disposed between the first porous electrode and the second porous electrode. The electrolyte layer includes a first dense ion-conductive doped oxide film layer, and a second dense ion-conductive doped oxide film layer deposited on the first doped oxide film layer, where the catalytic metal layer on the conductive porous non-metal layer enhances surface exchange rates and diffusivity of the oxide ions, thus the material costs of the fuel cell are reduced.

2 Claims, 1 Drawing Sheet

SOLID OXIDE FUEL CELL COMPONENTS TUNED BY ATOMIC LAYER DEPOSITION

CROSS-REFERENCE TO RELATED APPLICATIONS

This application is cross-referenced to and claims the benefit from U.S. Provisional Patent Application 60/930,592 filed May 16, 2007, which is hereby incorporated by reference.

FIELD OF THE INVENTION

The present invention relates generally to fuel cells. More particularly, the present invention relates to methods and systems whereby the fuel cell components are tuned through atomic layer deposition methods to reduce precious metal content in the electrodes.

BACKGROUND

Solid oxide fuel cells (SOFC) are of much interest due to their potential for high efficiency and fuel flexibility. SOFC generate electricity directly from an electrochemical reaction of fuels and oxidants. Unlike other types of fuel cells, SOFC's consist entirely of anhydrous solid-state components, such as an oxide electrolyte membrane that contains charged vacancies for oxide ion conduction and electrodes on both sides of the electrolyte membrane for current collection and catalysis. The SOFC reactions that represent reduction of oxygen into oxide ions at the cathodes and oxidation of oxide ions with fuel into water or other final products at the anodes mostly takes at or near contact boundaries between electrodes and electrolytes.

Typically, SOFC's operate at high temperatures. For example, temperatures between 700 and 1000° C. are useful for quick start-up and to reducing energy loss by electrical resistance through electrolytes or at the electrode-electrolyte boundaries. However, high temperature operation enhances breakdown of cell components. For this reason, there are efforts to reduce operation temperature. These efforts include engineering new materials used as fuel cell components, such as replacing yttria stabilized zirconia (YSZ), a typical electrolyte oxide of SOFC, with new materials such as samaria or gadolinia-doped ceria (SDC or GDC) that show higher oxide ion conductivity than YSZ's, or by replacing lanthanum strontium cobaltite ferrite (LSCF), a typical cathode of SOFC, with barium strontium cobaltite ferrite (BSCF) that shows lower electrolyte-electrode resistance.

Typically, SOFC electrodes use precious metal materials for catalysts such as platinum, ruthenium, palladium etc. These materials are very expensive and impact the overall fuel cell cost, which is very important for the commercialization of SOFC's. Desirable properties of these materials are good chemical stability and the ability to demonstrate high electrochemical activities i.e. high oxygen surface exchange rate.

Accordingly, there is a need to develop reduced cost solid oxide fuel cell having enhanced surface exchange rates and diffusivity of oxide ions.

SUMMARY OF THE INVENTION

To address the shortcomings in the art, a reduced cost solid oxide fuel cell having enhanced surface exchange rates and diffusivity of oxide ions is provided. The reduced cost solid oxide fuel cell includes a first porous electrode and a second porous electrode, where the porous electrodes have a layer of electronically conductive porous non-precious metal, where the porous non-precious metal layer is a gas diffusion layer. The porous electrodes further include at least one atomic layer of catalytic metal deposited on the non-precious metal layer, and an electrolyte layer disposed between the first porous electrode and the second porous electrode. The electrolyte layer includes a first dense ion-conductive doped oxide film layer, and a second dense ion-conductive doped oxide film layer deposited on the first doped oxide film layer, where the catalytic metal layer on the conductive porous non-metal layer enhances surface exchange rates and diffusivity of the oxide ions, thus the material costs of the fuel cell are reduced.

In one aspect of the invention, the non-precious metal can include copper, iron, nickel, tungsten, silver, chromium, cobalt, zinc, titanium, vanadium, molybdenum or a non-precious alloy, wherein the non-precious alloy may be any combination of copper, iron, nickel, tungsten, silver, chromium, cobalt, zinc, titanium, vanadium or molybdenum.

In another aspect of the invention, the precious metal may be platinum, ruthenium, palladium or a precious alloy, wherein the precious alloy is any combination of platinum, ruthenium or palladium In a further aspect of the invention the non-precious metal layer is applied by a growth method, where the growth method can be sputtering, evaporation, electroplating, pulsed laser deposition, chemical vapor deposition, or atomic layer deposition.

In yet another aspect, the precious metal layer can be an atomic layer deposition layer that provides enhanced surface electrochemical reaction during fuel cell operation.

In another aspect, the ion-conductive doped oxide film layers have a thickness in a range between 10 nm and 10 µm, where the layer is mechanically stable to be freestanding.

According to one embodiment, the first dense ion-conductive doped oxide film layer is a semi-porous layer. In a further aspect, the ion-conductive doped oxide film layers have a thickness in a range between 10 nm and 10 µm, where the layer is mechanically stable to be freestanding.

In a further aspect of the invention, the second dense ion-conductive doped oxide film layer is different from the first dense ion-conductive doped oxide film layer.

According to another aspect of the invention, the first dense ion-conductive doped oxide film layers can be yttria stabilized zirconia (YSZ), gadolinia doped ceria (GDC), yttria doped ceria (YDC), scandia doped zirconica (SDZ), samaria doped ceria (SDC), or proton conductors, where the proton conductors can include yttrium doped barium zirconate (BYZ), yttrium doped barium cerate (BYC) or yttrium doped barium zirconium cerium oxide (BYZC).

BRIEF DESCRIPTION OF THE FIGURES

The objectives and advantages of the present invention will be understood by reading the following detailed description in conjunction with the drawing, in which.

DETAILED DESCRIPTION OF THE INVENTION

Figure 1:
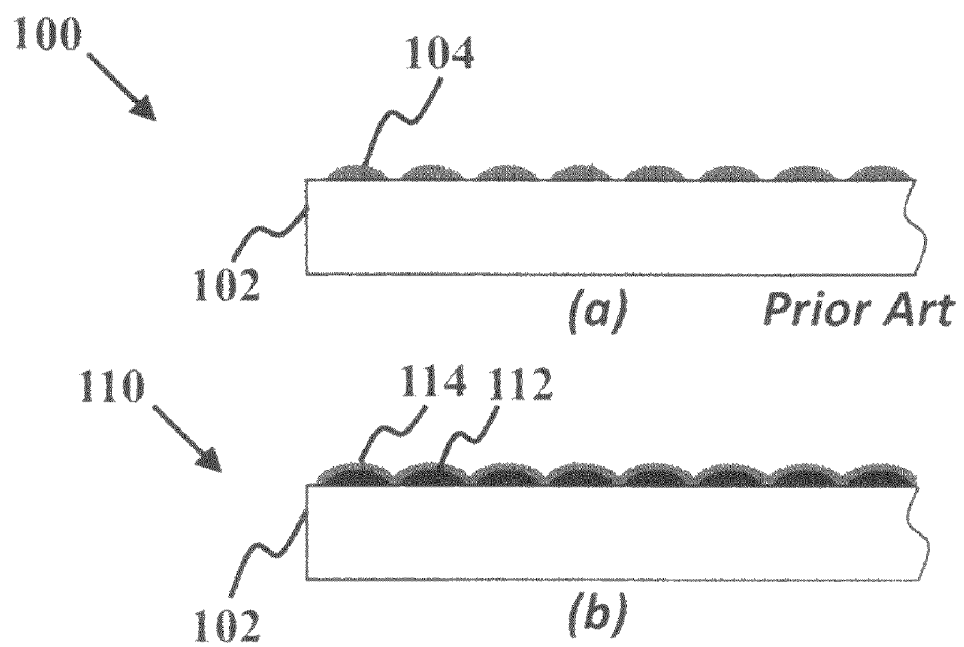
FIG. 1a shows a prior art SOFC electrode having an electrolyte layer and a porous precious metal catalytic layer.
FIG. 1b shows a porous electrode having electronically conductive layer of non-precious metals with a layer of catalytic metal on its surface according to the present invention.

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

As a scheme of engineering fuel cell materials, the current invention can vary composition or microstructure of solid oxide fuel cell materials in a layered fashion by using atomic layer deposition (ALD) processing. ALD is a modified chemical vapor deposition technique whereby the substrate surface is exposed alternately to different vaporized precursors. Because gaseous precursors are strictly separated from each other during deposition and the precursors have self-limiting chemistry, ideally one reaction cycle may produce one atomic layer only. For this reason, ALD is a useful fabrication method to modify the components of materials on an atomic scale because composition of ALD films can be altered at each atomic layer with desired ratios. The crystallinity and microstructure of ALD films are sensitive to the choice of the resource chemicals and the process conditions e.g. temperature.

Customizing composition and microstructure by ALD modifies the surface properties of films to functional needs, thus minimizing any generic adverse effects therein. For example, since catalysis occurs only at the boundary between surface of platinum clusters and electrolyte surface, metal clusters with platinum surface coating can perform the same function of the platinum clusters while saving a great amount of expensive platinum. This is one key aspect of the current invention. Since chemical degradation only happens at the exposed surface of electrolytes, SOFC with YSZ-coated GDC have performance characteristics that are superior to conventional YSZ-based SOFC with good chemical stability. In ALD of YSZ, the current invention enhances reduction the of oxygen into oxide ions at the electrode-electrolyte boundaries by increasing concentration of surface vacancies with increased concentration of dopant cations e.g. yttrium, where more ALD cycles of yttrium are provided near the surface. By adjusting process temperature, the current invention controls the density and surface roughness of ALD YSZ films, thus affecting the surface exchange rate and diffusivity of oxide ions through the membrane.

According to the current invention, supporting porous metal layers are provided using a sputtering technique or other micro-scale patterning techniques. Suitable materials for support metals can include but are not limited to non-precious electronically conductive metals i.e. copper, iron, nickel, tungsten, silver etc. Surface coating includes a few atomic layers of catalysts. Suitable materials for surface catalysts are typical catalysts of fuel cells that include but are not limited to platinum, ruthenium, palladium etc. The benefits here are cost reduction and stability against deformation by high temperature operation.

Required properties of host electrolyte oxides are high ionic conductivity and mechanical stability. Exemplary materials include but are not limited to oxide ion conducting oxides such as yttria stabilized zirconia (YSZ), gadolinia doped ceria (GDC), yttria doped ceria (YDC), scandia doped zirconica (SDZ), samaria doped ceria (SDC), and proton conductors, wherein the proton conductors are yttrium doped barium zirconate (BYZ), yttrium doped barium cerate (BYC) or yttrium doped barium zirconium cerium oxide (BYZC).

Required properties of surface materials are good chemical stability and ability to demonstrate high electrochemical activities i.e. high oxygen surface exchange rate. In surface composition modification, exemplary materials include doped oxide exhibiting high oxygen surface exchange rate i.e. GDC. In surface microstructure modification, exemplary structure include coarse atomic structure with increased roughness, accordingly increased interlocking sites between electrodes and electrolytes.

Referring now to the figures, FIG. 1a shows a prior art SOFC electrode 100 having a SOFC electrolyte layer 102 that supports a porous precious metal catalytic layer 104, for example a porous platinum catalyst. To manage SOFC costs, it is important to limit the use of expensive precious metals such as platinum, ruthenium, palladium, etc.

FIG. 1b shows a combination porous electrode 110 having an electronically conductive layer 112 of non-precious metals with a layer of catalytic metal 114 on its surface, according to one embodiment of the invention. Supporting porous non-precious metal layers 112 can be synthesized by sputtering techniques or other micro-scale patterning techniques. Suitable materials for support metals layers 112 are non-precious electronically conductive metals i.e. copper, iron, nickel, tungsten, silver etc. Surface coating consists of a few atomic layers of catalysts. Suitable materials for surface catalysts 114 are typical catalysts of fuel cells i.e. platinum, ruthenium, palladium etc. Expected benefits are cost reduction and stability against deformation by high temperature operation.

Figure 2:
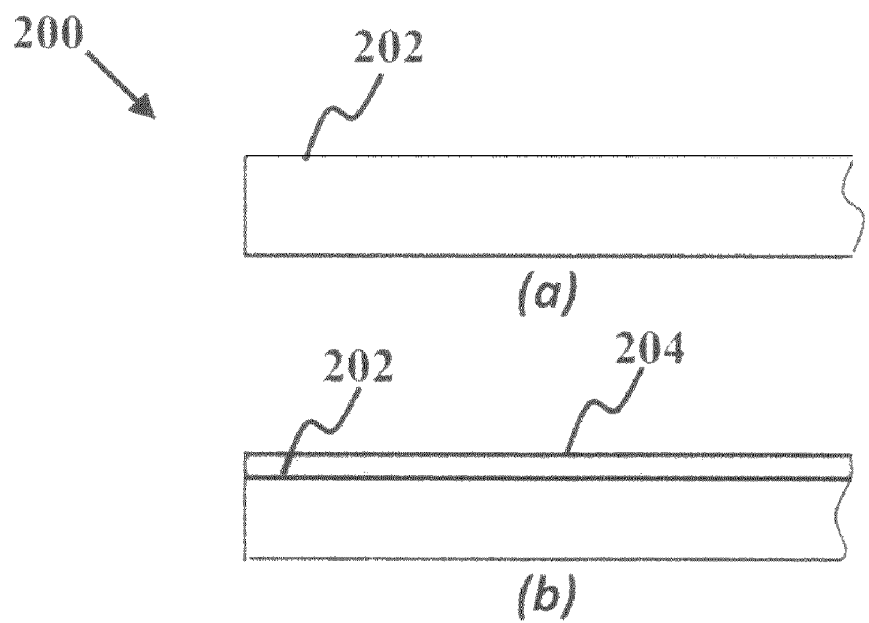
FIGS. 2a-2b show a comparison of electrolyte layers having surface composition modification according to the present invention.

FIGS. 2a-2b show an electrolyte layer comparison 200 of electrolyte layers 102 having surface composition modification, where FIG. 3a shows an untreated electrolyte layer 202, while FIG. 2b shows a treated electrolyte layer 204 having an improved oxygen surface exchange rate, where exemplary materials include doped oxide i.e. GDC. In surface microstructure modification, exemplary structure include coarse atomic structure with increased roughness, accordingly increased interlocking sites between electrodes and electrolytes.

Required properties of host electrolyte oxides are high ionic conductivity and mechanical stability. Exemplary materials include oxide ion conducting oxides i.e. yttria stabilized zirconia (YSZ), gadolinia doped ceria (GDC), yttria doped ceria (YDC), scandinia doped zirconica (SDZ), scandinia doped ceria (SDC), and proton conducting oxides i.e. yttrium doped barium zirconate (BYZ), yttrium doped barium cerate (BYC), yttrium doped barium zirconium cerium oxide (BYZC). Required properties of surface materials are good chemical stability and ability to demonstrate high electrochemical activities i.e. high oxygen surface exchange rate.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For example the membrane assembly can be fabricated not only as a flat two-dimensional plane but also as three-dimensional features i.e. circular tubes, spherical films or corrugated membranes.

All such variations are considered to be within the scope and spirit of the present invention as defined by the following claims and their legal equivalents.

What is claimed:

1. A reduced cost solid oxide fuel cell having enhanced surface exchange rates and diffusivity of oxide ions comprising:
   a. a first porous electrode and a second porous electrode, wherein said porous electrodes comprise:
      i. a layer of electronically conductive porous non-precious metal, wherein said porous non-precious metal layer is a gas diffusion layer;

ii. at least one atomic layer of catalytic metal deposited on said non-precious metal layer; and
b. an electrolyte layer disposed between said first porous electrode and said second porous electrode, wherein said electrolyte layer comprises:
 i. a first dense ion-conductive doped oxide film layer; and
 ii. a second dense ion-conductive doped oxide film layer deposited on said first doped oxide film layer,
wherein said catalytic metal layer on said conductive porous non-precious metal layer enhances surface exchange rates and diffusivity of said oxide ions, whereby material costs of said fuel cell are reduced wherein said first dense ion-conductive doped oxide film layer is a semi-porous layer.

2. The solid oxide fuel cell of claim 1, wherein said ion-conductive doped oxide film layers have a thickness in a range between 10 nm and 10 μm, whereby said layer is mechanically stable to be freestanding.

* * * * *